Dec. 11, 1928.

W. ELRICK 1,694,587

ROTARY ENGINE

Filed Nov. 8, 1926     2 Sheets-Sheet 1

Inventor
W. Elrick
by Fetherstonhaugh & Co.
Attys.

Dec. 11, 1928.
W. ELRICK
1,694,587
ROTARY ENGINE
Filed Nov. 8, 1926
2 Sheets-Sheet 2
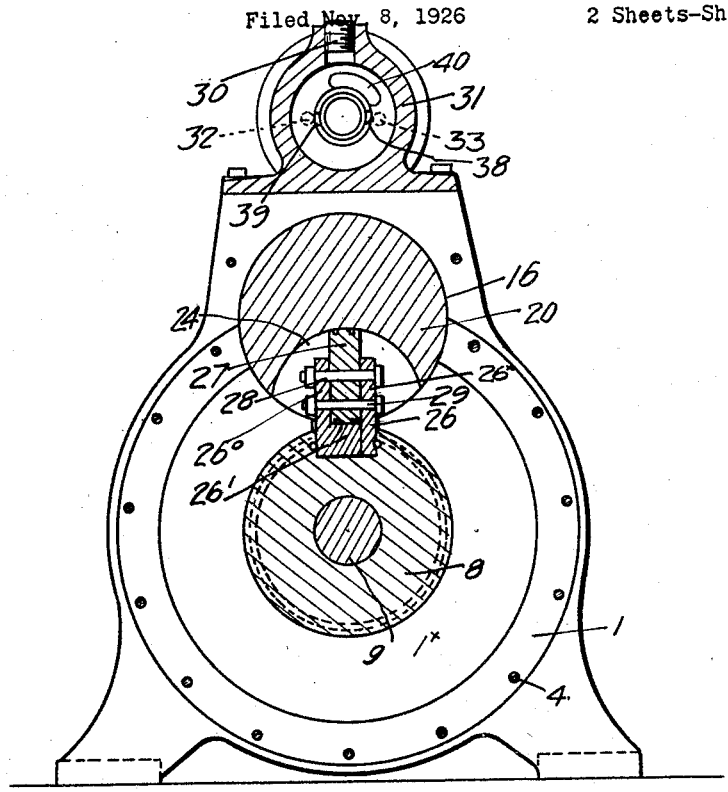
FIG. 2.
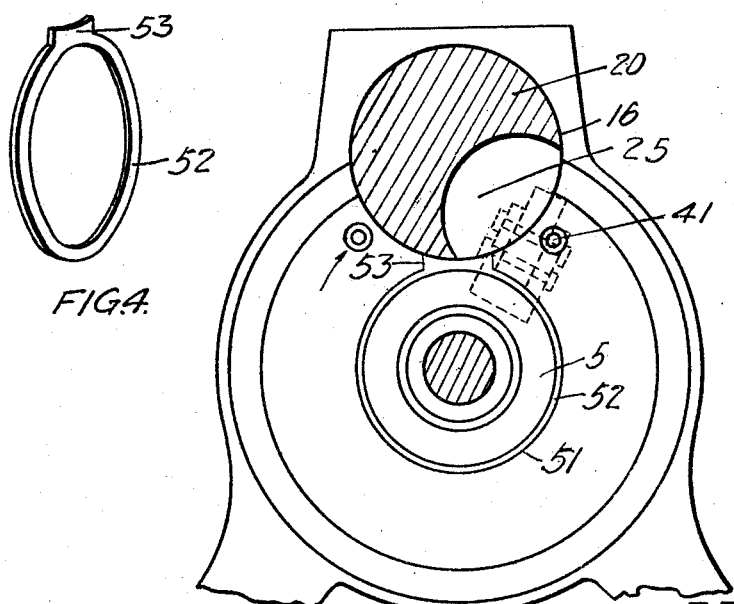
FIG.4.
FIG.3.
Inventor
W. Elrick
by Fetherstonhaugh & Co.
Attys.

Patented Dec. 11, 1928.

1,694,587

UNITED STATES PATENT OFFICE.

WILLIAM ELRICK, OF TORONTO, ONTARIO, CANADA, ASSIGNOR TO ELRICK ROTATING ENGINE COMPANY, LIMITED, OF TORONTO, CANADA, A CORPORATION OF ONTARIO.

ROTARY ENGINE.

Application filed November 8, 1926. Serial No. 147,168.

My invention relates to improvements in rotary engines, of the type in which a stationary cylindrical stator provided with an annular cylindrical concentric channel, a shaft extending through the stator centrally of the channel, a rotor secured to the shaft, a wing piston having a substantially circular head fitting the stator channel, and a revolving head mounted in the stator to revolve in contact with the rotor and having a chamber with which the piston head engages are employed, and the object of the invention is to so construct the engine that the rotor and head may always be driven in unison one with the other and in tight peripheral contact without friction and therefore at the same time forming steam tight joint therebetween, and in which any lateral leakage of steam from the head is prevented, and it consists essentially of the arrangement and construction of parts as hereinafter more particularly explained.

Fig. 2 is a cross sectional view on line 2—2 Figure 1.

Fig. 3 is a cross sectional view on line 3—3 Figure 1.

Fig. 4 is a perspective detail of one of the packing rings employed in the construction of my device.

In the drawings like characters of reference indicate corresponding parts in each figure.

Figure 1:
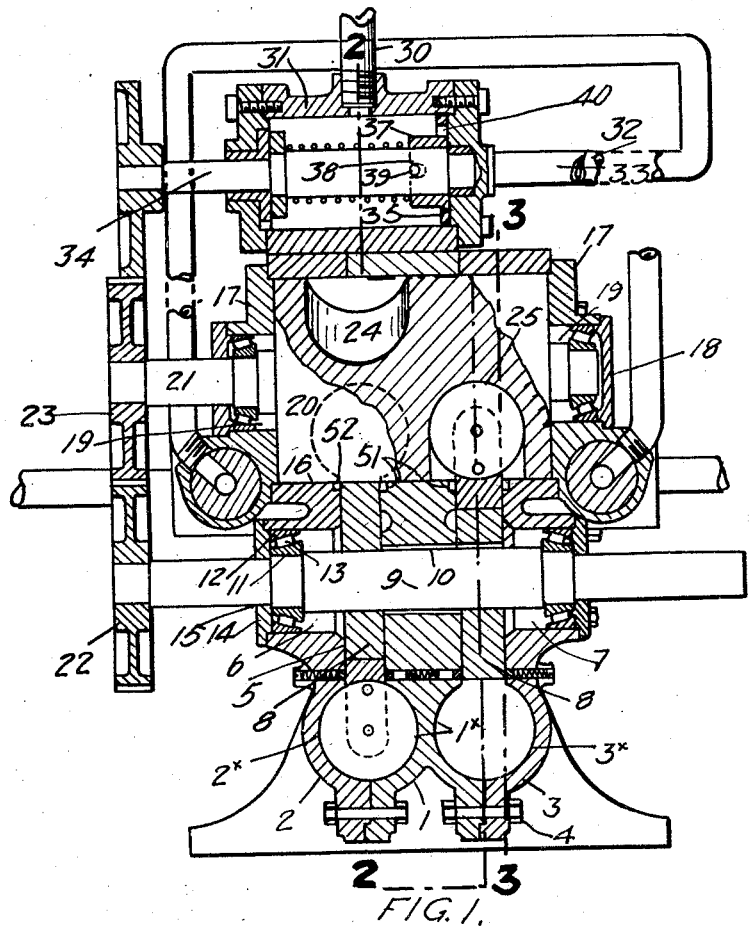
Fig. 1 is a longitudinal sectional view through my engine.

The stator body of my engine comprises a central member 1 and side members 2 and 3. In each side of the member 1 is formed a half channel $1^x$ each of which coact with a half channel $2^x$ and $3^x$ formed in the members 2 and 3 to form an annular stator channel when the parts are connected together by means of securing bolts 4. 5 is an annular rotor chamber around which the annular channel formed by the members $1^x$ and $2^x$ and $1^x$ and $3^x$ extend so as to communicate therewith. 6 and 7 are orifices formed in the wall of the side members 2 and 3 and located centrally of each rotor chamber 5. 8 is a circular rotor located in each rotor chamber 5. 9 is a shaft to which the circular rotors 8 are secured. The shaft 9 extends freely through an orifice 10 extending transversely through the central member 1 of the stator and at its ends through the orifices 6 and 7. 11 and 12 are the members of a tapered bearing secured respectively to the shaft 9 and within the interior periphery of the orifices 6 and 7. 13 are bearing rollers located between the members 11 and 12. 14 is a closing cap for each orifice 6 and 7 provided with a central orifice 15 through which the ends of the shaft extend. 16 is a cylindrical bore extending through the sections 1, 2 and 3 and extending laterally to each side of the rotor chambers 5 formed in the stator. 17 are caps secured to the members 2 and 3 to form closures for the ends of the orifices formed by the bore 16. 18 are closing caps for orifices 19 formed in the cap 17 concentrically with the centre of the bore 16. 20 is a rotating abutment fitting the bore 16 and secured to a shaft 21, the projecting ends of which extend centrally into the orifices 19, such ends being mounted within the orifices upon tapered bearings formed by members corresponding to the members 11 and 12 and bearing rollers 13 previously described.

22 is a gear secured to one end of the shaft 9. 23 is a gear secured to the corresponding end of the shaft 21 and meshing with the gear 22. The gears 22 and 23 are equal in size and therefore the rotating abutment is driven in unison with the rotors 8.

The abutment 20 is provided with chambered recesses 24 and 25 formed in opposite sides of the abutment 20 and in proximity to each end thereof and in alignment with each of the rotor chambers 5.

26 is a wing piston secured in each rotor 8, such wing piston comprising the members $26^x$ and $26^o$, one of such members being provided with a spacing piece $26^1$ formed integral therwith spacing the members $26^x$ and $26^o$ apart and providing a receiving space for the circular piston head 27 secured therebetween by means of bolts 28 and 29.

It will be readily seen on referring to Figure 1 that the piston head 27 fits each of the annular channels formed by the channel members $1^x$, $2^x$ and $3^x$. As the piston revolves within the aforesaid channels in the direction of arrow the piston 27 is in the dotted position shown in Figure 3 so as to permit the piston to leave the chambered recess 24 or 25. As the piston is carried through such recess it contacts with the opposite side of the recess as the abutment 20 revolves such recess gradually assuming the full line position shown in Figure 3 to enable the piston to pass to the dotted position shown in this figure clear of the abutment.

30 is a steam supply pipe leading into a steam chest 31. 32 and 33 are outlet steam pipes leading from the chest 31. 34 is a shaft extending centrally through the steam chest 31. 35 is a disc provided with a central sleeve 37 fitting the shaft 34 and provided with notches 38 engaging the pins 39 extending diametrically from the shaft 34 thereby causing the shaft and disc to revolve in unison. 40 is a slotted opening formed in the disc 35 which continuously revolves and alternately registers with the open ends of the pipes 32 and 33 so as to alternately feed steam into such pipes and convey it to the reversing valves of the engine hereinafter described which in turn feed it to the annular channels of the stator through the ports 41 immediately after the pistons 27 have passed such ports, the abutment 20 being in the full line position shown in Figure 3 at this point.

Figure 5:
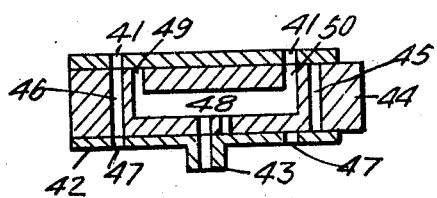
Figs. 5 and 6 are sectional detail views of the reversing valve shown in the two positions.
Figure 6:
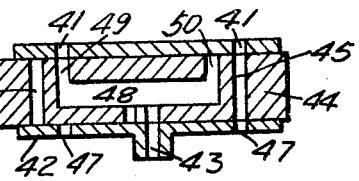

I will now describe the construction of reversing valve illustrated in Figures 5 and 6.

Each valve is formed by an outer sleeve 42 provided with an inlet port 43 to which the pipes 32 and 33 lead, a reversing valve being located at each side of the engine as clearly illustrated in Figure 1. The ports 41 hereinbefore referred to extend through the wall dividing the interior of the sleeve 42 from the interior of each of the annular rotor channels 2 and 3. 44 is a solid cylindrical member fitting within the sleeve 42 and adapted to be moved manually longitudinally within the sleeve. 45 and 46 are channels extending diametrically through the member 44 and adapted to alternately register with the ports 41 when in alignment with the exhaust orifices 47. 48 is a U-shaped channel, the ends of which 49 and 50 are designed to alternately register with the ports 41 to feed steam to the engine.

It will thus be seen by referring to Figures 5 and 6 that one of the ports 41 is feeding steam to the engine while the other port is exhausting.

51 are packing grooves formed in the opposing faces of the members 1 and 3 and 1 and 2 in which fits a metal packing ring 52, such ring being provided with a wing extension 53 fitting a correspondingly formed recess and having its edge arc-shaped and concentric to the centre of the abutment 20 as to fit against the periphery thereof as will be clearly seen in Figures 1 and 3 and thereby forming a steam tight joint at this point so there will be no leakage of steam laterally at the point of contact between the rotor and the rotating abutment. It will be readily understood that by cutting the bore 16 so as to form a cylindrical orifice adjacent to the rotor chamber that the metal will be cut to a feather edge and will in all probability entirely break through so the steam in operating the engine will leak. By providing a piston ring as above described this defect is overcome by cutting a recess formed in an extension of the packing groove 52 into which a ring 53 fits so as to cover this part of the casing and prevent any leakage of steam.

From this description it will be seen that I have devised a rotary engine in which a rotor and abutment revolve in unison in contact one with the other and therefore eliminate any friction therebetween, and at the same time forming a joint which is steam tight at all times and by which any leakage of steam either through the joint or laterally therefrom is prevented.

What I claim as my invention is,—

1. In a rotary engine, the combination with the annularly chambered stator and shaft extending therethrough, of a rotor secured to the shaft and contained in the chamber of the stator, a revolving abutment coacting with the rotor, a packing ring interposed between each side of the rotor and the wall of the stator chamber and having a wing extension extending radially therefrom opposite the line of contact between the rotor and abutment.

2. In a rotary engine, the combination with the annularly chambered stator and shaft extending therethrough, of a rotor secured to the shaft and contained in the chamber of the stator, a revolving abutment coacting with the rotor, a packing ring interposed between each side of the rotor and the wall of the stator chamber and having a wing extension extending radially therefrom opposite the line of contact between the rotor and abutment, and having the outer edge of the wing curved concentrically to the centre of the abutment to fit the outer periphery thereof.

3. In a device of the class described, an annular packing ring adapted to be interposed between the wall of the containing chamber and the opposing wall of the stator revolving therein and having a wing extension having its outer edge arc-shaped to fit the periphery of a revolving abutment having peripheral contact with the rotor.

WILLIAM ELRICK.